(12) United States Patent
Wong

(10) Patent No.: US 7,070,231 B1
(45) Date of Patent: Jul. 4, 2006

(54) PORTABLE SEAT COOLER

(76) Inventor: Peter H. Wong, 15 Roslyn Hills Dr., Richmond, VA (US) 23229

( * ) Notice: Subject to any disclaimer, the term of this patent is extended or adjusted under 35 U.S.C. 154(b) by 0 days.

(21) Appl. No.: 11/041,475

(22) Filed: Jan. 24, 2005

(51) Int. Cl.
*A47C 7/74* (2006.01)
(52) U.S. Cl. .............................. 297/180.11; 297/180.1; 297/180.13; 297/180.14
(58) Field of Classification Search ........... 297/180.11, 297/180.12, 180.13, 180.14, 180.1
See application file for complete search history.

(56) References Cited

U.S. PATENT DOCUMENTS

| | | | | |
|---|---|---|---|---|
| 3,757,366 A * | 9/1973 | Sacher | ............... | 297/180.13 X |
| 4,002,108 A * | 1/1977 | Drori | ................. | 297/180.13 X |
| 4,175,297 A * | 11/1979 | Robbins et al. | ..... | 297/180.11 X |
| 4,712,832 A * | 12/1987 | Antolini et al. | ........ | 297/180.11 |
| 4,793,651 A * | 12/1988 | Inagaki et al. | ......... | 297/180.11 |
| 4,923,248 A * | 5/1990 | Feher | ..................... | 297/180.11 |
| 5,372,402 A * | 12/1994 | Kuo | ................... | 297/180.11 X |
| 5,382,075 A * | 1/1995 | Shih | ................... | 297/180.11 X |
| 5,613,729 A * | 3/1997 | Summer, Jr. | ........... | 297/180.11 |
| 5,613,730 A * | 3/1997 | Buie et al. | .......... | 297/180.11 X |
| 5,645,314 A * | 7/1997 | Liou | ................. | 297/180.11 X |
| 5,692,952 A * | 12/1997 | Chih-Hung | ........ | 297/180.11 X |
| 5,921,858 A * | 7/1999 | Kawai et al. | ........ | 297/180.11 X |
| 6,109,688 A * | 8/2000 | Wurz et al. | ............ | 297/180.14 |
| 6,189,967 B1 * | 2/2001 | Short | ................ | 297/180.11 X |
| 6,511,125 B1 * | 1/2003 | Gendron | ................ | 297/180.11 |
| 6,629,724 B1 * | 10/2003 | Ekern et al. | ........... | 297/180.11 |
| 6,840,576 B1 * | 1/2005 | Ekern et al. | ........ | 297/180.11 X |
| 2003/0197404 A1 * | 10/2003 | Ekern et al. | ........... | 297/180.11 |
| 2004/0155506 A1 * | 8/2004 | Gentry | ............. | 297/180.11 X |

\* cited by examiner

*Primary Examiner*—Rodney B. White

(57) ABSTRACT

A portable seat cushion comprising: A) a seat portion; B) a back portion; and C) an integral fan that circulates air through the seat and back portions, the front portion having a front surface, a perimeter, a rear surface and an interior between the rear and front surfaces and the back portion having a front surface, a top, a bottom, a perimeter, a rear surface and an interior between the rear surface and the front surface, the seat and back portions being joined by a flexible connection that permits the seat and back portions to rotate relative to each other and provides a mechanism for the passage of air from the seat portion to the back portion. The rear surfaces and perimeters of each of the seat and back portions is relatively air impermeable while the front surfaces of these members is air permeable. The interior of each of the back and seat portions includes a semi-rigid undulating member that defines passages for the movement of air from the incorporated fan to the seat and back portions and to the front surfaces of the seat and back portions through apertures therein.

8 Claims, 4 Drawing Sheets

PORTABLE SEAT COOLER

FIELD OF THE INVENTION

The present invention relates to portable seat cooling devices and more particularly to such devices that can be used in an automobile to provide localized cooling for the seat and back areas of a user.

BACKGROUND OF THE INVENTION

While conventional automotive air conditioning provides cooling to the "front" portions of an individual on hot summer days, the back and seat portions of an individual driver or passenger receives little relief from such conventional general automotive interior cooling because of the lack of exposure of such areas of the body to the air conditioned environment. Thus, the provision of cooling to the seat and back areas of, for example, an automobile driver or passenger during hot weather has been the subject of much development.

U.S. Pat. No. 6,189,967 to Short issued Feb. 20, 2001 describes a portable air cooled seat cushion provided with a fan that produces an air stream directed to the interior of the portable cushion. The cushion has an air permeable outer covering on the front face thereof that permits air to flow out of the cushion against the legs and back of a user. A fan is located remote from the cushion and is connected to the cushion by a flexible hose to provide air circulation within the seat and back portions of the cushion. The interior of the cushion includes a relatively porous filler that provides air passages within the seat and back portions of the cushion. A preferred embodiment utilizes an existing such seat cushion that incorporates a series of wire coils as the relatively open porous filler that allows for "virtually unrestricted air flow through the seat and back portions of the cushion". While such a device may provide a basic cooling structure, it possesses many shortcomings. Among these are the need to store and locate a remotely located fan/connecting hose assembly in the already crowded front seat of an automobile and the relatively poor air distribution provided by the wire coil structure in the cushion. In order to achieve appropriate air distribution in such a cushion an extremely high volume fan needs to be injected to assure that all of the circulating air is not disbursed through the cushion at or near the port of entry or very poor air distribution will be provided throughout the cushion.

U.S. Pat. No. 6,629,724 to Ekern et al. issued Oct. 7, 2003 describes a ventilated seat cushion assembly comprising an upper surface layer formed of a porous material, a lower surface layer and two inner layers. The first inner layer is formed of a non-porous material that faces the upper surface and is provided with ventilation holes for allowing air to flow though the upper surface layer. The second inner layer is porous and is positioned between to first inner layer and the lower surface layer. The inner porous layer is preferably a "spring-like" cushion having top and bottom netting and an interior consisting of rigidized threads extending between the top and bottom netting. An incorporated fan drives or sucks air through the second inner layer into or out of the ventilation holes provided in the first inner layer and hence through the upper surface layer. Thus, this device relies upon an array of "rigidized threads" to provide the porosity necessary to allow communication of cooling air from the fan to the upper surface layer. A tacky layer is used between the porous inner layer and the lower surface to inhibit relative movement between these elements. While such a device provides an alternative to that described by Short it also may not provide the longevity desired for such a device because of its reliance upon "rigidized threads" for the provision of a porous interior layer for the circulation of air within the device. Such an arrangement, while probably providing satisfactory initial service, will almost undoubtedly become less effective as the rigidized threads are repeatedly crushed by the weight of the user over time. Thus, it would be desirable to have a structure that would provide for an extended life for such a seat cooling device.

OBJECTS OF THE INVENTION

It is therefore an object of the present invention to provide a portable seat cooling device that provides uniform and efficient air distribution throughout a seat and back cooling cushion.

It is another object of the present invention to provide a portable seat and back cooling cushion that while providing uniform and efficient air distribution also exhibits a useful life significantly longer than similar prior art such devices.

SUMMARY OF THE INVENTION

According to the present invention, there is provided a seat and back cooling cushion comprising: A) a seat portion; B) a back portion; and C) an integral fan that circulates air through the seat and back portions, the seat portion having a front surface, a perimeter, a rear surface and an interior between the rear and front surfaces and the back portion having a front surface, a top, a bottom, a perimeter, a rear surface and an interior between the rear surface and the front surface, the seat and back portions being joined by a flexible connection that permits the seat and back portions to rotate relative to each other and provides a mechanism for the passage of air from the seat portion to the back portion. The rear surfaces and perimeters of each of the seat and back portions are relatively air impermeable while the front surfaces of these members are air permeable. The interior of each of the back and seat portions includes a semi-rigid undulating member that defines passages for the movement of air from the incorporated fan to the seat and back portions and to the front surfaces of the seat and back portions through apertures therein.

DETAILED DESCRIPTION

Figure 1:
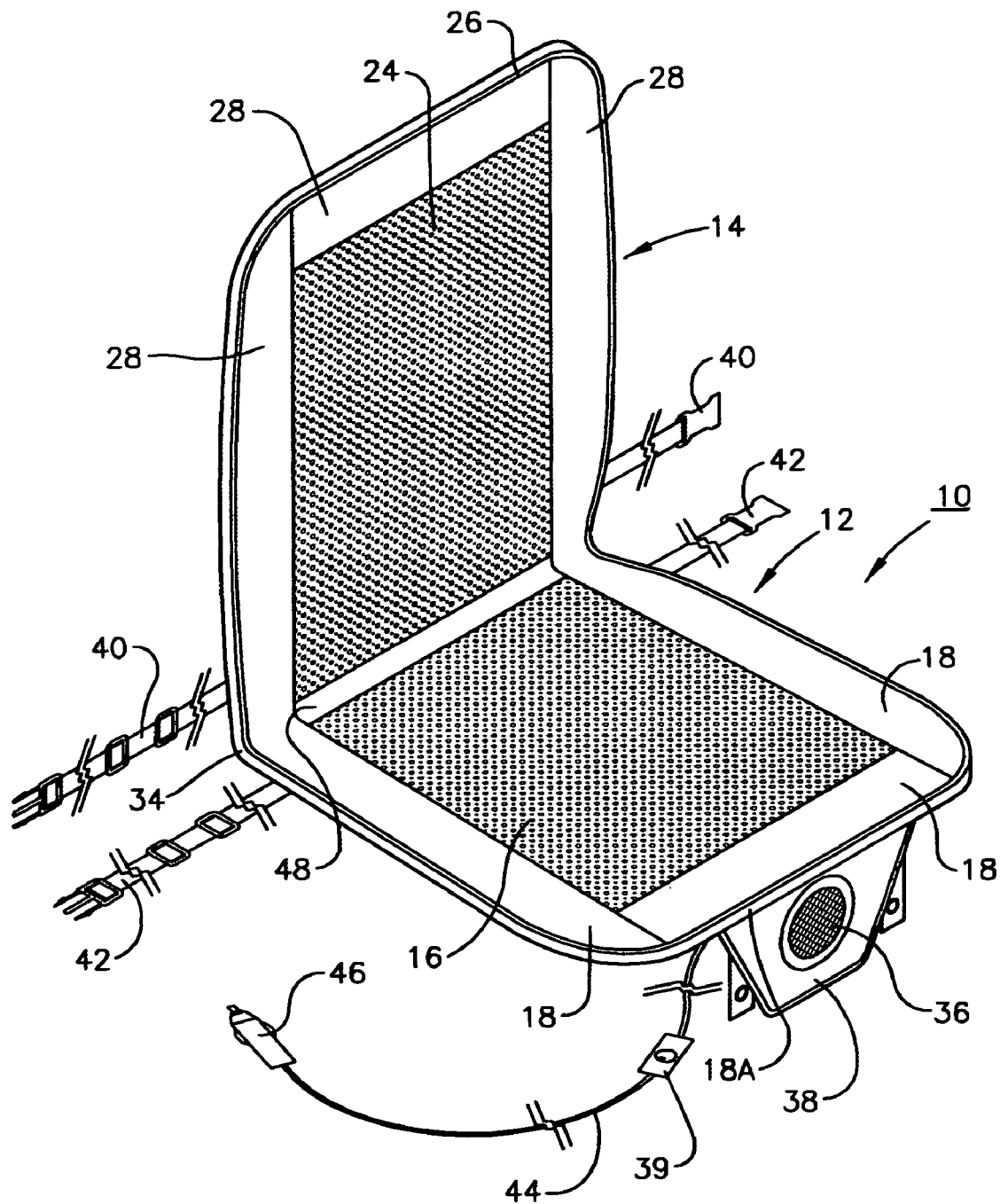
FIG. 1 is a front perspective view of the seat cushion of the present invention in its folded position as it would appear installed on the seat of a car.
Figure 2:
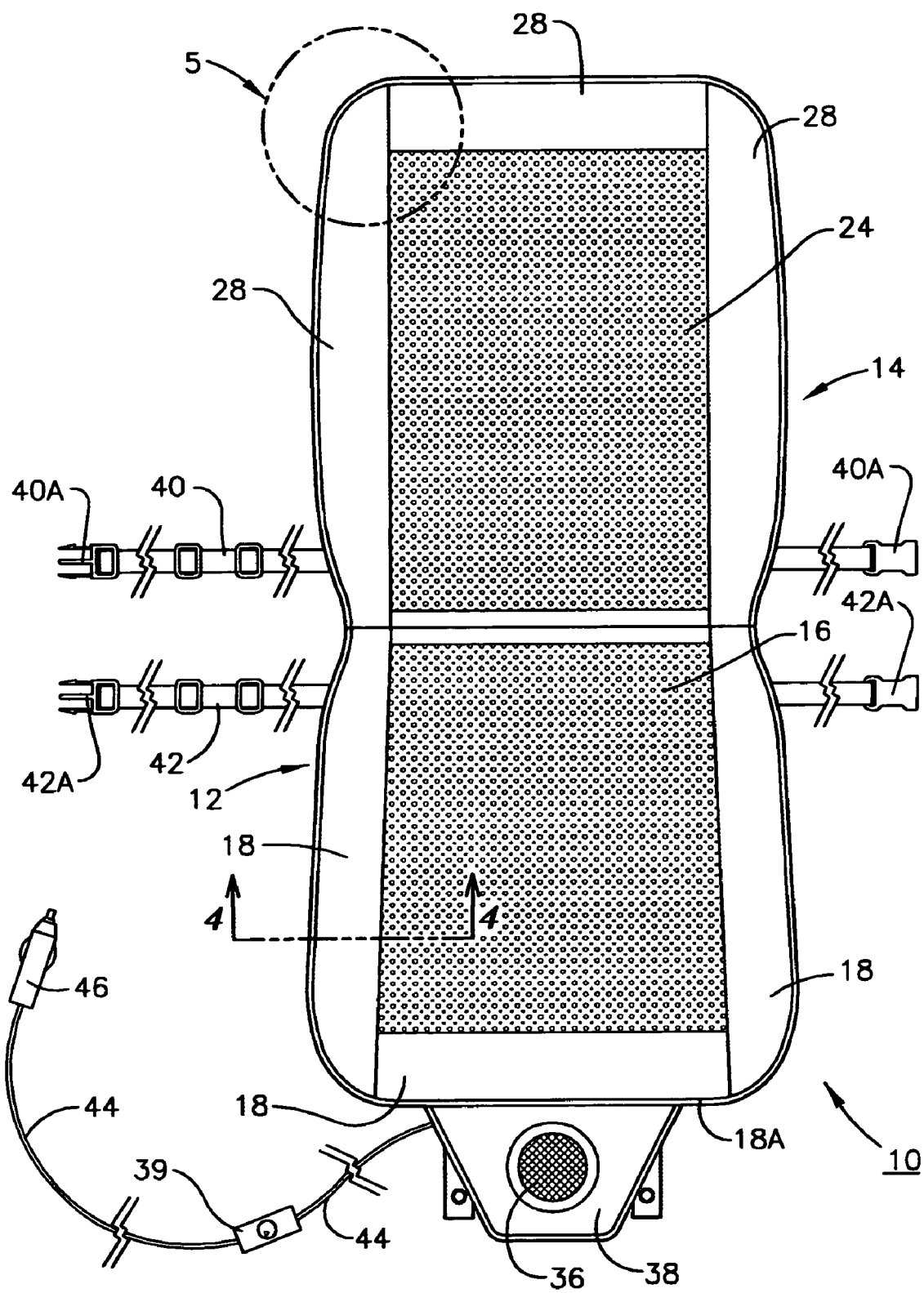
FIG. 2 is a front view of the seat cushion of the present invention in it flattened position.
Figure 3:
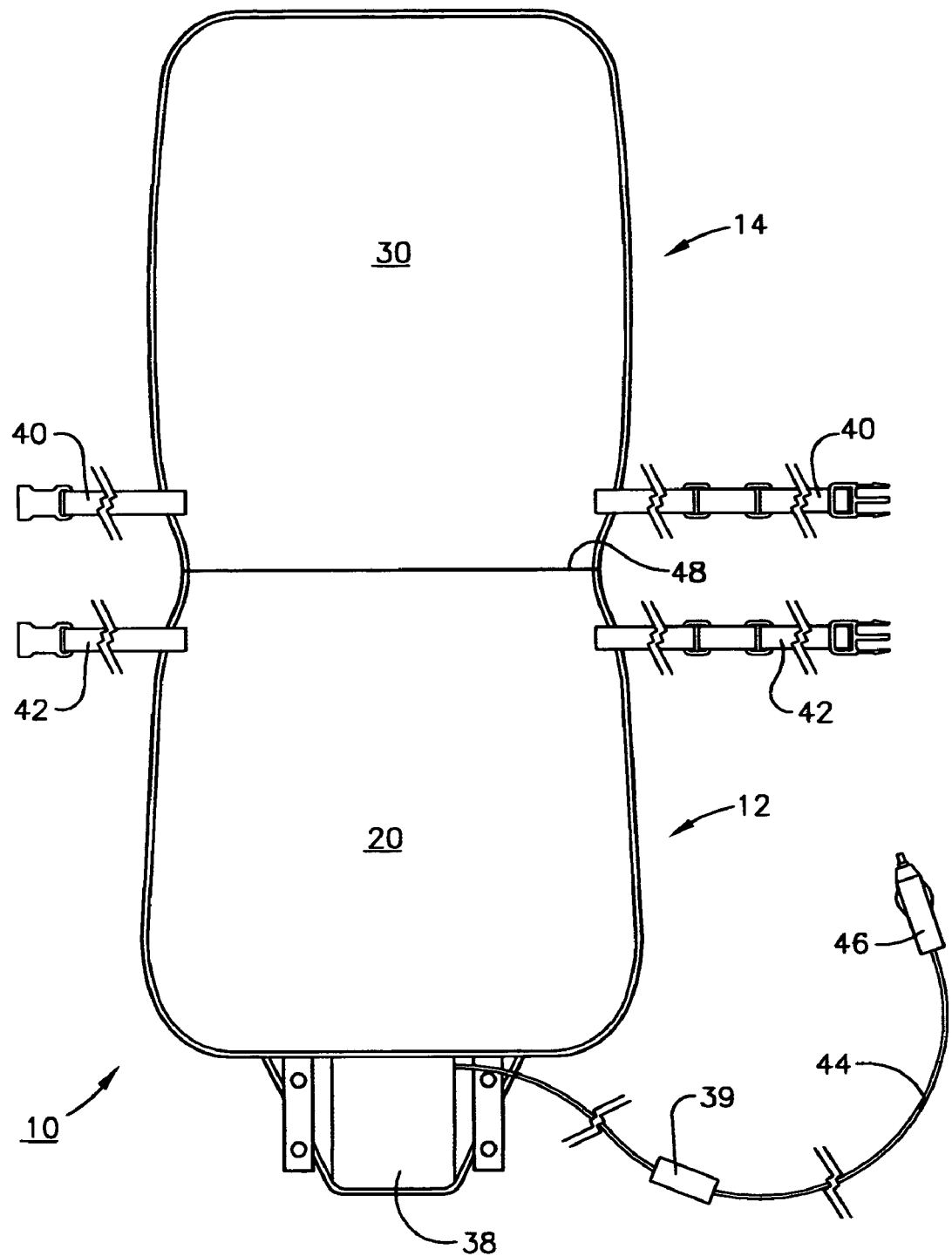
FIG. 3 is a rear view of the seat cushion of the present invention in it flattened position.

Referring now to FIG. 1, the seat cushion 10 of the present invention comprises: a seat portion 12; a back portion 14; seat portion 12 having a front surface 16, a perimeter 18, a rear surface 20 (best seen in FIGS. 3 and 4), and an interior 22 between front surface 16 and rear surface 20 (best seen in FIG. 4); back portion 14 having a front surface 24, a top 26, a perimeter 28, a rear surface 30 (best seen in FIGS. 3 and 4), a bottom 34 and an interior 32 between front surface 24 and rear surface 30 (best seen in FIG. 4); and an integral fan 36 mounted in a tongue 38 extending from the front perimeter 18A of seat portion 12. Belts 40 and 42 incorporating latches 40A and 42A are attached to perimeters 28 and 18 of back and seat portions 14 and 12 respectively for fastening seat cushion 10 to an existing automobile or other seat/chair (not shown). An electrical connecting cord 44 is electrically attached to fan 36 is to provide power to fan 36. Preferably, electrical connecting cord 44 is equipped with a fitting 46 for plugging into the power outlet receptacle of an automobile (not shown). As will be apparent to the skilled artisan, in this embodiment fan 36 will operate on either a 12 or 24 volt system, but fan 36 could also be made to operate based on a conventional 120 or 240 volt system by the introduction of a suitable transformer in electrical cord 44, the use of a different and appropriate fitting 44 along with a high voltage fan in lieu of a low voltage fan, or the use of a transformer into which fitting 46 inserts to provide conversion of standard household electrical current to 12/24 volt current. An adjustable switch such as a rheostat 39 or other similarly adjustable switch is preferably provided to allow adjustment of the speed of fan 36 and hence the amount of air circulated into seat cushion 10 as described below and hence the level of cooling imparted to a user. According to a further preferred embodiment, adjustable switch 39 is also programmable so as to permit adjustment of the period for which fan 36 will run before being automatically turned off. For example, such a device would allow for adjustable switch 39 to run for a set period, say a run cycle of one hour before automatically turning itself off.

Seat and rear portions 12 and 14 are joined by a hinge 48 formed by the attachment of the material of seat portion 12 and back portion 14 as described in greater detail below in connection with the description of FIG. 4. Hinge 48 incorporates a mechanism for the transmission of air from seat portion 12 to back portion 14. This mechanism may be as simple as the provision of sewn in channels or the incorporation of flexible conduit tubes that bend with hinge 48 but still allow the passage of air from seat portion 12 to back portion 14. It is readily within the skill of the artisan to design a wide variety of such mechanisms.

Figure 4:
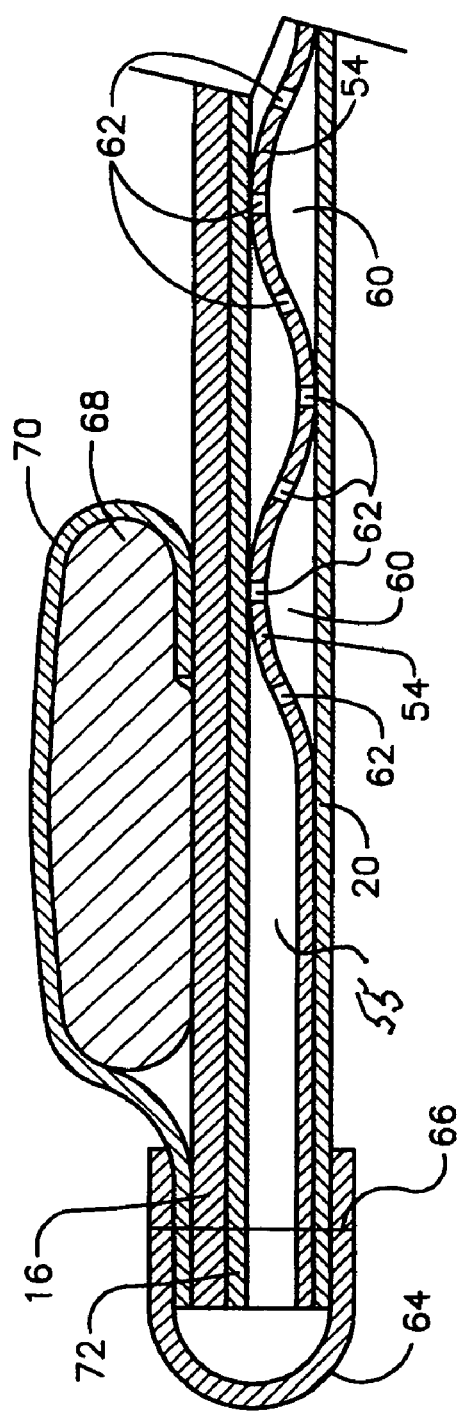
FIG. 4 is a cross-sectional view along the line 4—4 of FIG. 2.
Figure 5:
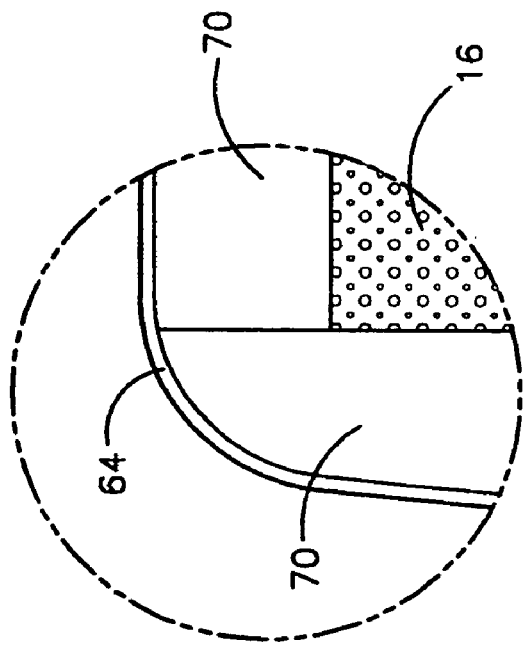
FIG. 5 is a close-up, partially cutaway/detailed view of the area 5 shown in FIG. 2.

Referring now to FIG. 4 that depicts a cross-sectional view of seat cushion 10 along the line 4—4 of FIG. 1, seat cushion 10 includes a seat portion interior 54 that is of virtually identical structure to a back seat interior portion (not shown in the Figures but referred to hereinafter by the numeral 55 for ease in discussing it) that both lie between air permeable front and air impermeable rear surfaces 16 and 20 and 24 and 30 respectively. Within interiors 55 are semi-rigid, undulating or corrugated conduit panels 54 that define channels 60 and serve to conduct air driven by fan 36 through seat portion 12 and thence via hinge 48 through back portion 14. Panels 54 also incorporate apertures 62 that allow the passage of air from channels 60 to front surfaces 16 and 24 through the air permeable material forming these surfaces. As used herein the term "semi-rigid" is meant to mean a structure of an undulating or corrugated structure of a material that can and will flex under the weight of a seat cushion user to provide comfort cushioning, but remains sufficiently stiff or rigid as to maintain channels 60 open so that air forced therethrough by fan 36 can penetrate channels 60 and travel from fan 36 to and through interiors 55 of seat and back portions 12 and 14 while allowing sufficient air to penetrate air permeable front surfaces 16 and 24 as to allow cooling of a user.

Front surfaces 16 and 24 are fabricated from an air permeable material such as an air permeable fabric or leather or vinyl having appropriately located and sized apertures therein that allow for the passage of air from interiors 55 of seat and back portions 12 and 14 through front surfaces 16 and 24 and thence toward the body of an individual seated on seat cushion 10.

Additional desirable and preferred features and elements of the a preferred embodiment of the cooling cushion of the present invention include, as best seen in FIG. 4: air impermeable edging 64 that forms perimeters 18 and 28 and is stitched or sewn at 66 to and through front surfaces 16 and 24 to retain the structural integrity of cushion 10; an incorporated peripheral foam cushion or pad 68 that serves to define a seating area about perimeters 18 and 28 and which is retained in position by an overlying portion of fabric 70 that may be of an air permeable or air impermeable material depending upon the desires of the manufacturer or user; and a second air permeable layer 72 that adds an additional layer of strength and resilience to upper surfaces 16 and 24 and that is located between upper surfaces 16 and 24 and interiors 55 respectively.

A wide variety of materials for use in the seat cushion 10 of the present invention will be readily apparent to those skilled in the art of fabrication of such devices, according to various preferred embodiments of the present invention, the air impermeable portions of seat cushion 10 as described hereinabove are fabricated from a leather, leatherette (e.g. vinyl) or sealed ballistic cloth of a type commonly used in the fabrication of luggage or the like, for example, a polyurethane sealed fabric or simply a polyurethane material that is impermeable to air. The material that forms air permeable surfaces 16 and 24 may be simply a suitable upholstery cloth that provides adequate air permeability, or a custom perforated material that is specifically selected for the purpose of forming air-permeable surfaces 16 and 24. As to the composition of semi-rigid undulating panels, these may comprise any suitable polymeric or metallic material with properties adequate to provide the resilience and cushioning effects necessary to provide user comfort as well as air permeability to provide forced air conduit from fan 36 to front surfaces 16 and 24 as required to obtain user cooling.

As the invention has been described, it will be apparent to those skilled in the art that the same may be varied in many ways without departing from the spirit and scope of the invention. Any and all such modifications are intended to be included within the scope of the appended claims.

What is claimed is:

1. An air cooled seat cushion comprising:
   A) a seat portion having an air permeable front surface, an air impermeable perimeter, an air impermeable rear surface and an interior between the seat portion front and rear surfaces;
   B) a back portion having an air permeable front surface, a top, a bottom, an air impermeable perimeter, an air impermeable rear surface and an interior between the back portion front rear surfaces;
   C) an integral fan that circulates air through the seat and back portions;
   D) an air transmitting hinge area at a point of juncture between the seat and back portions sequentially; and
   E) semi-rigid, undulating conduit panels located within the seat portion and back portion interiors that define channels for conducting air from the fan into the seat and back portion interiors and include apertures allowing air to escape from the channels to the air permeable seat and back portion front surfaces.

2. The seat cushion of claim 1 further including a tongue pendant from the seat portion, the integral fan being located within the tongue.

3. The seat cushion of claim 2 further including a padded or cushioned portion about the seat portion air impermeable periphery.

4. The seat cushion of claim 3 further including a padded or cushioned portion about the back portion air impermeable periphery.

5. The seat cushion of claim 2 further including an electric cord for connection of the fan to a suitable source of electricity.

6. The seat cushion of claim 5 further including a mechanism for connecting the fan via the electric cord to an electrical circuit selected from the group consisting of a DC power plug, and AC power plug and an AC adapter.

7. The seat cushion of claim 6 further including a mechanism for adjusting the speed of or setting the period of a run cycle for the fan in the electric cord.

8. The seat cushion of claim 1 wherein the air permeable seat and back front surfaces comprise an air permeable mesh and the air impermeable seat and back rear surfaces and perimeters comprise a material selected from the group consisting of polyurethane, vinyl, leather and sealed ballistic cloth.

* * * * *